United States Patent [19]

Throckmorton

[11] Patent Number: 4,663,405
[45] Date of Patent: May 5, 1987

[54] MOLECULAR WEIGHT MODIFIER FOR USE WITH LANTHANIDE AND ACTINIDE CATALYSTS

[75] Inventor: Morford C. Throckmorton, Akron, Ohio

[73] Assignees: The Goodyear Tire & Rubber Company, Akron, Ohio; Enichimica S.p.A.; Enichem Polimeri

[21] Appl. No.: 852,678

[22] Filed: Apr. 16, 1986

[51] Int. Cl.$^4$ ............................................. C08F 4/72
[52] U.S. Cl. .................................. 526/144; 526/164
[58] Field of Search ..................... 526/144, 164, 338

[56] References Cited

U.S. PATENT DOCUMENTS

| | | | |
|---|---|---|---|
| 3,846,388 | 11/1974 | Ohashi | 526/338 |
| 4,145,497 | 3/1979 | Sylvester | 526/164 |
| 4,242,232 | 12/1980 | Sylvester | 526/164 |
| 4,533,711 | 8/1985 | Takeuchi | 526/164 |

*Primary Examiner*—Paul R. Michl
*Attorney, Agent, or Firm*—Alvin T. Rockhill

[57] ABSTRACT

Lanthanide and actinide catalyst systems normally appear to be "pseudo-living" when they are used to polymerize conjugated diolefin monomers into polymers. Polymerizations which are catalyzed with such catalyst systems produce polymers which have increasingly high molecular weight as monomer conversions are increased. Consequently, any change in polymerization time or conversion may affect the polymer's ultimate molecular weight. This has made controlling the molecular weight of polymers which are made utilizing lanthanide and actinide catalysts difficult.

It has been unexpectedly discovered that vinyl halides can be used as molecular weight regulators for polymerizations which are catalyzed with lanthanide and actinide catalyst systems. Accordingly, the present invention relates to a process which comprises polymerizing at least one conjugated diolefin monomer in the presence of (a) a catalyst system which is comprised of (1) an organoaluminum compound, (2) an organometallic compound which contains a metal from Group III-B of the Periodic System, and (3) at least one compound which contains at least one labile halide ion; and (b) a vinyl halide.

31 Claims, No Drawings

MOLECULAR WEIGHT MODIFIER FOR USE WITH LANTHANIDE AND ACTINIDE CATALYSTS

BACKGROUND OF THE INVENTION

Rare earth catalyst systems, such as lanthanide systems, are normally considered to be "pseudo-living." The polymers made utilizing such rare earth catalyst systems accordingly increase in molecular weight with increasing monomer conversions. The molecular weight of polymers made utilizing such catalyst systems have traditionally been regulated by limiting conversions and/or adjusting the level of catalyst utilized. In any case, any change in polymerization time or conversion has traditionally affected the ultimate molecular weight of the polymer being synthesized. Since residence times in continuous polymerization systems are sometimes difficult to control precisely, linear relationships between molecular weight and monomer conversion causes the production of polymers having varying molecular weights. In other words, the molecular weight of polymers made utilizing rare earth catalyst systems is often difficult to control.

In polymerizations which are conducted on a commercial basis, it is often highly advantageous to attain high monomer conversions. Attaining high monomer conversions is particularly beneficial in bulk polymerizations. However, there is a demand for polymers made using rare earth catalyst systems which have low or only moderately high molecular weights. Unfortunately, traditional molecular weight modifiers which are effective for use with Ziegler-Natta catalyst systems are ineffective for use in polymerizations which are catalyzed with rare earth systems. For instance, α-olefins and nonconjugated diolefins are effective chain transfer agents for use with Ziegler-Natta catalyst systems (see U.S. Pat. No. 4,383,097 and South African Patent No. 83/2555). However, α-olefins and nonconjugated diolefins are ineffective as molecular weight regulators for use with rare earth catalyst systems. The molecular weight of polymers made with Alfin catalysts can be reduced by conducting such polymerizations in the presence of 1,4-and 1,2-dihydronaphthalene. It has, however, been determined that 1,4- and 1,2-dihydronaphthalene cannot be used as molecular weight modifiers in polymerizations which are catalyzed with rare earth metal catalysts.

There are many benefits which are derived from using preformed rare earth metal catalyst systems. Unfortunately, the problem of molecular weight control may be further complicated by utilizing preformed catalyst systems since they produce polymers which have higher molecular weights than those made with catalysts which were not preformed.

SUMMARY OF THE INVENTION

The present invention is based upon the unexpected discovery that vinyl halides can be used as molecular weight regulators in polymerizations which are catalyzed with rare earth metal catalyst systems. Vinyl halides are effective as molecular weight regulators in both solution and bulk polymerizations. Accordingly the present invention reveals, in a process for polymerizing conjugated diolefin monomers into polymers which utilizes a catalyst system which is comprised of (1) an organoaluminum compound, (2) an organometallic compound which contains a metal from Group III-B of the Periodic System and (3) at least one compound which contains at least one labile halide ion: the improvement which comprises controlling the molecular weight of the polymer being produced by conducting the polymerization in the presence of a vinyl halide.

The present invention also reveals a process which comprises polymerizing at least one conjugated diolefin monomer in the presence of (a) a catalyst system which is comprised of (1) an organoaluminum compound, (2) an organometallic compound which contains a metal from Group III-B of the Periodic System and (3) at least one compound which contains at least one labile halide ion; and (b) a vinyl halide.

DETAILED DESCRIPTION OF THE INVENTION

This invention is directed to a method for polymerizing conjugated diolefin monomers into polymers having a large proportion of cis 1,4-structure. The conjugated diolefins which can be polymerized in accordance with the present invention generally have the general formula:

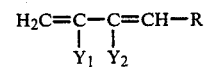

wherein R is selected from hydrogen atoms, alkyl (including cycloalkyl), alkaryl or aryl groups containing from one to eight carbon atoms, and wherein $Y_1$ and $Y_2$ represent either hydrogen or alkyl radicals having from 1 to 4 carbon atoms and may be the same or different radicals.

Thus, this invention relates to the stereospecific polymerization of compounds represented by but not limited to 1,3-butadiene, isoprene, piperylene or 1,3-pentadiene, 2-methyl-1,3-pentadiene, 2-ethyl-1,3-butadiene, 4-butyl-1,3-pentadiene, 2,3-dimethyl-1,3-pentadiene, 1,3-hexadiene, 1,3-octadiene, 1-phenyl-1,3-butadiene and the like.

The homopolymers of such diolefins when produced in accordance with this invention contain more than 95 percent of their microstructure in the 1,4-configuration. Such homopolymers are non-crystalline at ambient temperatures.

This invention is also directed to a method for polymerizing certain diolefins with certain other diolefins to form copolymers. For instance, the diolefins may be defined by the formula:

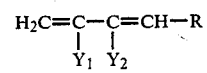

wherein R is selected from hydrogen atoms, alkyl (including cycloalkyl), alkaryl or aryl groups containing from one to eight carbon atoms, and where $Y_1$ and $Y_2$ represent either hydrogen or alkyl radicals having from 1 to 4 carbon atoms and may be the same or different radicals, may be copolymerized with conjugated diolefins of the formula:

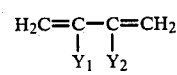

where $Y_1$ and $Y_2$ represent either hydrogen or alkyl radicals having from 1 to 4 carbon atoms.

Thus, this invention relates to the stereospecific copolymerization of compounds represented by, but not limited to, piperylene or 1,3-pentadiene, 2-methyl-1,3-pentadiene, 4-butyl-1,3-pentadiene, 1,3-pentadiene, 1,3-hexadiene, 1,3-octadiene, 1-phenyl-1,3-pentadiene, 2,3-dibutyl-1,3-pentadiene and 2-ethyl-1,3-pentadiene with other conjugated diolefins, such as 1,3-butadiene, 2-methyl-1,3-butadiene or isoprene, 2-ethyl-1,3-butadiene and the like.

The copolymers of such diolefins when produced in accordance with this invention generally contain more than 90 percent of their microstructure in a 1,4-configuration. The portion of the copolymer resulting from the conjugated diolefins having only four carbons in the chain are of high cis-1,4-configuration. The portion of the copolymer resulting from the diolefins having the formula:

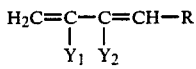

are in the 1,4-configuration. Such copolymers are generally not crystalline at ambient temperatures.

The catalyst systems to which this invention pertains are comprised of three components. These components are (1) an organoaluminum compound, (2) an organometallic compound which contains a metal from Group III-B of the Periodic System, and (3) at least one compound which contains at least one labile halide ion. The organoaluminum compound contains at least one carbon to aluminum bond and can be represented by the structural formula:

in which $R_1$ is selected from the group consisting of alkyl (including cycloalkyl), alkoxy, aryl, alkaryl, arylalkyl radicals and hydrogen: $R_2$ is selected from the group consisting of alkyl (including cycloalkyl), aryl, alkaryl, arylalkyl radicals and hydrogen and $R_3$ is selected from a group consisting of alkyl (including cycloalkyl), aryl, alkaryl and arylalkyl radicals. Representative of the compounds corresponding to this definition are: diethylaluminum hydride, di-n-propylaluminum hydride, di-n-butylaluminum hydride, diisobutylaluminum hydride, diphenylaluminum hydride, di-p-tolylaluminum hydride, dibenzylaluminum hydride, phenylethylaluminum hydride, phenyl-n-propylaluminum hydride, p-tolylethylaluminum hydride, p-tolyl-n-propylaluminum hydride, p-tolylisopropylaluminum hydride, benzylethylaluminum hydride, benzyl-n-propylaluminum hydride, and benzylisopropylaluminum hydride and other organoaluminum hydrides. Also included are ethylaluminum dihydride, butylaluminum dihydride, isobutylaluminum dihydride, octylaluminum dihydride, amylaluminum dihydride and other organoaluminum dihydrides. Also included are diethylaluminum ethoxide and dipropylaluminum ethoxide. Also included are trimethylaluminum, triethylaluminum, tri-n-propylaluminum, triisopropylaluminum, tri-n-propylaluminum, triisopropylaluminim, tri-n-butylaluminum, triisobutylaluminum, tripentylaluminum, trihexylaluminum, tricyclohexylaluminum, trioctylaluminum, triphenylaluminum, tri-p-tolylaluminum, tribenzylaluminum, ethyldiphenylaluminum, ethyl-di-p-tolylaluminum, ethyldibenzylaluminum, diethylphenylaluminum, diethyl-p-tolylaluminum, diethylbenzylaluminum and other triorganoaluminum compounds.

In the organometallic compound which contains a metal from Group III-B of the Periodic System the metal ion forms the central core of atom to which ligand-type groups or atoms are joined. These compounds are sometimes known as coordination-type compounds. These compounds may be symbolically represented as $ML_3$ wherein M represents the above-described metal ions of Group III-B and L is an organic ligand containing from 1 to 20 carbon atoms selected from a group consisting of (1) o-hydroxyaldehydes, (2) o-hydroxyphenones, (3) aminophenols, (4) hydroxy esters, (5) hydroxy quinolines, (6) β-diketones, (7) monocarboxylic acids, (8) ortho dihydric phenols, (9) alkylene glycols, (10) dicarboxylic acids, (11) alkylated derivatives of dicarboxylic acids and (12) phenolic ethers.

The Group III-B metals which are useful in the organometallic compound include scandium, yttrium, the lanthanides, and the actinides. The lanthanides include lanthanum, cerium, praseodymium, neodymium, promethium, samarium, europium, gadolinium, terbium, dysprosium, holmium, erbium, thulium, ytterbium and lutetium. The actinides include actinium, thorium, protactinium, uranium, neptunium, plutonium, americium, curium, berkelium, californium, einsteinium, fermium, mendelerium, and lawrencium. The preferred actinides are thorium and uranium which have atomic numbers of 90 and 92, respectively. The preferred Group III-B metals are cerium, praseodymium, neodymium and gadolinium which have atomic numbers of 58, 59, 60, and 64 respectively. The most preferred lanthanide metal is neodymium.

In the organometallic compound utilized the organic portion includes organic type ligands or groups which contain from 1 to 20 carbon atoms. These ligands can be of the monovalent and bidentate or divalent and bidentate form. Representative of such organic ligands or groups are (1) o-hydroxyaldehydes such as salicylaldehyde, 2-hydroxyl-1-naphthaldehyde, 2-hydroxy-3-naphthaldehyde and the like; (2) o-hydroxyphenones such as 2'-hydroxyacetophenone, 2'-o-hydroxybutyrophenone, 2'-hydroxypropiophenone and the like: (3) aminophenols such as o-aminophenol, N-methyl o-aminophenol, N-ethyl o-aminophenol and the like: (4) hydroxy esters such as ethyl salicylate, propyl salicylate, butyl salicylate and the like: (5) phenolic compounds such as 2-hydroxyquinoline, 8-hydroxyquinoline and the like: (6) β-diketones such as acetylacetone, benzoylacetone, propionylacetone, isobutyrylacetone, valerylacetone, ethylacetylacetone and the like; (7) monocarboxylic acids such as acetic acid, propionic acid, valeric acid, hexanoic acid, 2-ethylhexanoic acid, neodecanoic acid, lauric acid, stearic acid and the like: (8) ortho dihydric phenols such as pyrocatechol; (9) alkylene glycols such as ethylene glycol, propylene glycol, trimethylene glycol, tetramethylene glycol and the like: (10) dicarboxylic acids such as oxalic acid, malonic acid, maleic acid, succinic acid, o-phthalic acid and the like: (11) alkylated derivatives of the above-described dicarboxylic acids; (12) phenolic ethers such as o-hydroxyanisole, o-hydroxyethyl phenol ether and the like.

Representative organometallic compounds of the Group III-B metals, corresponding to the formula $ML_3$, which may be useful in this invention include cerium acetylacetonate, cerium naphthenate, cerium neodecanoate, cerium octanoate, tris-salicylaldehyde cerium, cerium tris-(8-hydroxyquinolate), gadolinium naphthenate, gadolinium neodecanoate, gadolinium octanoate, lanthanum naphthenate, lanthanum octanoate, neodymium naphthenate, neodymium neodecanoate, neodymium octanoate, praseodymium naphthenate, prasodymium octanoate, yttrium acetylacetonate, yttrium octanoate, dysprosium octanoate, tris($\pi$-allyl) uranium chloride, tris($\pi$-allyl) uranium bromide, tris($\pi$-allyl) uranium iodide, uranium tetramethoxide, uranium tetraethoxide, uranium tetrabutoxide, uranium octanoate, thorium ethoxide, tris($\pi$-allyl) thorium chloride, thorium naphthenate, uranium isovalerate, and other Group III-B metals complexed with ligands containing form 1 to 20 carbon atoms.

The third catalyst component utilized in the catalyst system is a compound which contains a halide ion. Some representative examples of halide ions which can be utilized include bromide ions, chloride ions, fluoride ions, and iodide ions. A combination of two or more of these ions can also be utilized. These halide ions can be introduced as (1) hydrogen halides: (2) alkyl, aryl, alkaryl, aralkyl and cycloalkyl metal halides wherein the metal is selected from the Groups II, III-A and IV-A of the Periodic Table; (3) halides of metals of Groups III, IV, V, VI-B and VIII of the Periodic Table and (4) organometallic halides corresponding to the general formula $ML_{(3-y)}X_y$ wherein M is a metal selected from the group consisting of metals of Group III-B of the Periodic Table having atomic numbers of 21, 39 and 57 through 71 inclusive: L is an organic ligand containing from 1 to 20 carbon atoms and selected from the group consisting of (a) o-hydroxyaldehydes, (b) o-hydroxyphenones, (c) hydroxyquinolines, (f) $\beta$-diketones, (g) monocarboxylic acids, (h) ortho dihydric phenols, (i) alkylene glycols, (j) dicarboxylic acids, (k) alkylated derivatives of dicarboxylic acids and (1) phenolic ethers; X is a halide ion and y is an integer ranging from 1 to 2 and representing the number of halide ions attached to the metal M. The organic ligand L may be of the monovalent and bidentate or divalent and bidentate form.

Representative examples of such compounds containing a labile halide ion include (1) inorganic halide acids, such as hydrogen bromide, hydrogen chloride and hydrogen iodide: (2) organometallic halides, such as ethylmagnesium bromide, butylmagnesium bromide, phenylmagnesium bromide, methylmagnesium chloride, butylmagnesium chloride, ethylmagnesium iodide, phenylmagnesium iodide, diethylaluminum bromide, diisobutylaluminum bromide, methylaluminum sesquibromide, diethylaluminum chloride, ethylaluminum dichloride, ethylaluminum sesquichloride, diisobutylaluminum chloride, isobutylaluminum dichloride, dihexylaluminum chloride, cyclohexylaluminum dichloride, phenylaluminum dichloride, didodecylaluminum chloride, diethylaluminum fluoride, dibutylaluminum fluoride, diethylaluminum iodide, dibutylaluminum iodide, phenylaluminum diiodide, trimethyltin bromide, triethyltin chloride, dibutyltin dichloride, butyltin trichloride, diphenyltin dichloride, tributyltin iodide and the like; (3) inorganic halides, such as aluminum bromide, aluminum chloride, aluminum iodide, antimony pentachloride, antimony trichloride, boron tribromide, boron trichloride, ferric chloride, gallium trichloride, molybdenum pentachloride, phosphorus tribromide, phosphorus pentachloride, stannic chloride, titanium tetrachloride, titanium tetraiodide, tungsten hexachloride and the like: and (4) organometallic (Group III-B) halides, such as t-butyl-salicylaldehydrocerium (III) chloride, salicylaldehydrocerium (III) chloride, 5-cyclohexylsalicylaldehydrocerium (III) chloride, 2-acetylphenolatocerium (III) chloride, oxalatocerium (III) chloride, oxalatocerium (III) bromide and the like. The preferred compounds which contain a labile halide ion are inorganic halide acids and organometallic halides.

The rare earth metal catalyst system can be prepared using an "in situ" technique or it can be "preformed." By "in situ" is meant that the catalyst components are added separately to the monomer to be polymerized. By "preformed" is meant the manner in which the catalyst components are mixed together prior to exposure of any of the components to the monomer to be polymerized. It is also known that when employing the type of catalyst system described in this invention, the presence of monomer is not essential to the formation of an active catalyst species, thus, facilitating the use of "preformed" catalysts. Also, it is known that freshly "preformed" catalysts are frequently more active than catalysts which have been allowed to age before use. Greatly improved "preformed" catalysts can be prepared by carrying out the "preforming" in the presence of small amounts of conjugated diolefins. Preforming in the presence of monomers results in homogeneous (soluble) catalyst systems, whereas those prepared by mixing in the absence of monomers are frequently heterogeneous (insoluble). Such a "preforming" technique is described in detail in U.S. Pat. No. 3,794,604 which is incorporated herein by reference.

The proportions of the components of the polymerization catalyst compositions of this invention can be varied widely. When the halide ion of the halogen containing compound is bromide, chloride or iodide ion, the atomic ratio of the halide ion to the Group III-B metal can vary from about 0.1/1 to about 6/1. A more preferred ratio is from about 0.5/1 to about 3.5/1 and the most preferred ratio is about 2/1. However, when the halide ion of the halogen-containing compound is fluoride ion, the ratio of the fluoride ion to the Group III-B metal ion ranges from about 20/1 to about 80/1 with the most preferred ratio being about 30/1 to about 60/1. The molar ratio of the trialkylaluminum or alkylaluminum hydride to Group III-B metal can range from about 4/1 to about 200/1 with the most preferred range being from about 8/1 to about 100/1. The molar ratio of diolefin to Group III-B metal can range from about 0.2/1 to 3000/1 with the most preferred range being from about 5/1 to about 500/1.

The amount of catalyst charged to the reduction system can be varied over a wide range: the sole requirement being that a catalytic amount of the catalyst composition, sufficient to cause polymerization of the diolefin, be present in the reaction system. Low concentrations of catalyst are desirable in order to minimize ash problems. It has been found that polymerizations will occur when the catalyst level of the Group III-B metal varies between 0.05 and 1.0 millimole of Group III-B metal per 100 grams of monomer. A preferred ratio is between 0.1 and 0.3 millimole of Group III-B metal per 100 grams of monomer.

The concentration of the total catalyst system employed of course, depends upon factors such as purity of the system, polymerization rate desired, temperature and other factors. Therefore, specific concentrations cannot be set forth except to say that catalytic amounts are used.

The polymerization of the diolefin can be carried out by utilizing a bulk polymerization procedure or a solution polymerization procedure employing suitable inert solvents. By the term "inert solvent" is meant that the solvent or diluent does not enter into the structure of, or affect adversely, the resulting polymer. Such solvents are usually aliphatic, aromatic and cycloaliphatic hydrocarbons, representative of which are pentane, hexane, heptane, benzene, toluene, cyclohexane and the like. The solvent/monomer volume ratio may be varied over a wide range. Up to 20 or more to 1 volume ratio of solvent to monomer can be employed. It is usually preferred, or more convenient, to use a solvent/monomer ratio of about 3/1 to about 6/1. In bulk polymerization procedures the reaction medium is substantially solventless and will contain no more than about 10% organic compounds which are solvents for the polymer being synthesized, based upon the total weight of the reaction medium. In most cases the reaction medium will contain less than 4% by weight solvents or virtually no solvents at all.

Temperatures at which the polymerization reaction is carried out can be varied over a wide range. Usually the temperature can be varied from extremely low temperatures such as −60° C. up to high temperatures such as 150° C. or higher. Thus, the temperature is not a critical factor of the invention. It is generally preferred, however, to conduct the reaction at a temperature in the range of from about 10° C. to about 90° C. The pressure at which the polymerization is carried out can also be varied over a wide range. The reaction can be conducted at atmospheric pressure or, if desired, it can be carried out at sub-atmospheric or super-atmospheric pressure. Generally, a satisfactory polymerization is obtained when the reaction is carried out at about autogenous pressure, developed by the reactants under the operating conditions used.

The vinyl halides that can be utilized as molecular weight regulators include vinyl fluoride, vinyl chloride, vinyl bromide and vinyl iodide. Vinyl bromide, vinyl chloride and vinyl iodide are preferred. Generally, vinyl chloride and vinyl bromide are most preferred. The amount of vinyl halide utilized will vary with the molecular weight which is desired for the polymer being synthesized. Naturally, the use of greater quantities of the vinyl halide results in the production of a polymer having lower molecular weights. As a general rule, from about 0.05 to 10 phm (parts per hundred parts of monomer) of a vinyl halide will be utilized. In most cases from 0.1 phm to 2.5 phm of a vinyl halide will be present during the polymerization. Persons skilled in the art will be able to easily ascertain the amount of vinyl halide in order to produce a polymer having a specifically desired molecular weight.

This invention is illustrated by the following examples which are merely for the purpose of illustration and are not to be regarded as limiting the scope of the invention or the manner in which it can be practiced. Unless specifically indicated otherwise, parts and percentages are given by weight. A polymer's molecular weight can be designated in terms of dilute solution viscosity (DSV), inherent viscosity, Mooney viscosity, number average molecular weight ($M_n$) and weight average molecular weight ($M_w$). In the following examples dilute solution viscosities were determined in 0.1 to 0.5 weight percent toluene solutions at 30° C. Mooney viscosities were determined using a large rotor, a one minute warm-up time and a four minute running time at 100° C. The number and weight average molecular weights reported were determined using Waters TM GPC Model No. 150C gel permeation chromatograph instrument with the polymers dissolved in chloroform.

EXAMPLES 1-9

A butadiene in hexane solution was passed down a column containing silica gel powder, and measured quantities of the solution were charged into a series of four ounce (118 ml) bottles. The solutions were sparged with dry nitrogen for 25 seconds after which they contained about ten grams of butadiene per 100 milliliters of solution in each bottle.

Incremental amounts of one of three potential molecular weight modifying agents were charged to each of these solutions, except for the first one—which served as a control—as shown in Column 3 of Table I. The catalyst components were charged to each bottle by the "in situ" method as follows: (a) 0.92 ml of 0.87 molar triisobutylaluminum (TIBAL) in hexane, (b) 0.43 ml of 0.058 molar neodymium 2-ethyl hexanoate (Nd Oct) and (c) 0.10 ml of 0.25 molar ethylaluminum dichloride (EADC) in hexane. The bottles then were capped tightly using a rubber liner and a Teflon seal. The bottles were placed in a water bath controlled at 50° C. and were rotated end-over-end for the length of time listed in Table I. The polymerizations were terminated by injecting 0.05g of 2,4,6-tris-(dimethylaminomethyl)-phenol, 0.1 g dibutyl-para-cresol and 0.5 ml methanol in hexane solution. The polymer solutions were placed in Petri dishes and were air and then vacuum dried.

The addition of 2,500 to 10,000 parts per million of vinyl chloride to the butadiene resulted in lowering the molecular weight of the resulting polybutadienes as evidenced by both inherent viscosities (DSV) and the weight average molecular weights as determined by gel permeation chromatographic analyses presented in columns 6 and 7 in Table 1. On the other hand, chloroethane and 1,4-dihydronaphthalene were ineffective as molecular weight modifiers.

TABLE I

| Example | Potential Mol Wt Modifying Agent Identity | Amt, ppm in BD | Pzn Time, Hrs | Polymer Yield wt % | DSV, dl/g | $M_w \times 10^{-3}$ Weight Avg Mol Wt |
|---|---|---|---|---|---|---|
| 1 | None | 0 | 1 | 48 | 4.64 | ND |
| 2 | Vinyl chloride | 1,000 | 2 | 68.4 | 4.66 | 746 |
| 3 | Vinyl chloride | 2,500 | 2 | 69.5 | 4.32 | 682 |
| 4 | Vinyl chloride | 5,000 | 2 | 68 | 3.54 | 634 |
| 5 | Vinyl chloride | 10,000 | 2 | 64 | 3.68 | 669 |
| 6 | Chloroethane | 1,000 | 2 | 66.5 | 4.65 | ND |

TABLE I-continued

| Example | Potential Mol Wt Modifying Agent Identity | Amt, ppm in BD | Pzn Time, Hrs | Polymer Yield wt % | DSV, dl/g | Mw × 10$^{-3}$ Weight Avg Mol Wt |
|---|---|---|---|---|---|---|
| 7 | Chloroethane | 10,000 | 4 | 62.6 | 4.94 | ND |
| 8 | 1,4-dihydronaphthalene | 2,500 | 2 | 66 | 4.58 | ND |
| 9 | 1,4-dihydronaphthalene | 10,000 | 2 | 56 | 4.51 | ND |

ND = Not determined

EXAMPLES 10-16

A homogeneous "preformed" catalyst was prepared in the presence of butadiene as follows: 12 ml of a 2.45 molar solution of dry butadiene in hexane were injected by syringe into a dry, nitrogen-flushed 118 ml glass bottle containing a magnetic stirring bar; 37.2 ml of a 1.2 molar solution of diisobutylaluminum hydride in hexane were added; 5.2 ml of 0.66 molar neodymium octoate in hexane were injected slowly with stirring and with brief cooling in a beaker of ice water; and 13.4 ml of 0.25 molar ethylaluminum dichloride solution were injected slowly with stirring. This catalyst solution (A) was allowed to stand at room temperature for three hours before it was utilized in the following experiments.

6.95 Grams of vinyl chloride was injected by syringe into a capped 118 ml bottle containing 48.57 grams of dry hexane. This was calculated to contain 8.58 weight-/volume percent of vinyl chloride in hexane. Then 3.3 ml of preformed catalyst solution A was injected into a dry, nitrogen-flushed bottle, followed by 8 ml of the vinyl chloride in hexane solution in order to determine whether the preformed catalyst would remain active after standing in the presence of vinyl chloride. This was labelled catalyst solution B.

One hundred mls of a dry butadiene in hexane solution containing 13.3 grams of butadiene were charged to each of a series of seven 118 ml bottles. The first bottle served as a control. Incremental amounts of the vinyl chloride in hexane solution ranging between 1,000 and 25,000 parts per million of vinyl chloride based upon the weight of butadiene were injected by syringe into five bottles of butadiene in hexane. Then 0.66 ml of preformed catalyst solution A was injected into each of these six bottles of premix, and 2.3 ml of catalyst solution B was injected into the seventh bottle. Fresh bottle caps were used to seal the bottles which then were tumbled end-over-end at 50° C. in a water bath for one hour, except that the bottle in Example No. 15 was permitted to remain for 70 minutes. The polymerizations were terminated as described for Examples 1 through 9. The results are shown in Table II.

TABLE II

| Example | Vinyl Chloride, ppm | Catalyst | Polymer Yield, wt % | DSV dl/g |
|---|---|---|---|---|
| 10 | 0 | A | 87 | 2.58 |
| 11 | 1,000 | A | 87.5 | 2.27 |
| 12 | 2,500 | A | 85 | — |
| 13 | 5,000 | A | 86 | 2.28 |
| 14 | 10,000 | A | 81 | 2.14 |
| 15 | 25,000 | A | 85 | 2.23 |
| 16 | 10,000 | B | 80 | 2.28 |

EXAMPLES 17-26

A homogeneous "preformed" catalyst was prepared in the presence of some butadiene as follows: 60 ml of a 2.2 molar solution of butadiene in hexane were injected by syringe into a dry, nitrogen-flushed 240 ml glass bottle: 94.5 ml of a 2.2 molar solution of diisobutylaluminum hydride in hexane were added; 12.3 ml of 0.66 molar solution of neodymium octoate in hexane were injected slowly with stirring by a magnetic stirring bar; and 32.4 ml of 0.25 molar ethylaluminum dichloride solution in hexane were injected slowly with stirring and with slight cooling. This catalyst solution was permitted to stand at room temperature for 36 days before it was used in the experiments described herein.

One hundred mls of a dry butadiene in hexane solution containing 13.3 grams of butadiene were charged to each of a series of 118 ml bottles. Incremental amounts ranging between 1,000 to 25,000 parts per million of five unsaturated halocarbons were injected by syringe into the butadiene in hexane solutions. The halocarbons were diluted with hexane to prepare a 5 to 7 weight-/volume percent solution before injection into the premix. Thus, 3 ml, or 4.55 grams, of vinyl bromide were injected into a bottle containing 65 ml of dry hexane to prepare a 6.8 wt/vol percent solution of vinyl bromide in hexane. The appropriate amounts of this solution were injected into the butadiene in hexane solutions to prepare the concentrations indicated in Column 2 of Table III. Then 0.78 ml aliquots of the catalyst described in the first paragraph was injected into each bottle, which then was sealed with a fresh cap and liner. The concentration of catalyst components was about Bd/DIBA-H/NdOct/EADC =4/3.35/0.24/0.24 millimoles/100 g of butadiene.

All bottles were placed in a water bath which was controlled at 50° C., and tumbled end-over-end for one hour (except Bottle Nos. 22 and 26 were polymerized for 2.5 and 2 hours, respectively). The polymerizations were terminated with 2,4,6-tris-(dimethylaminomethyl)phenol, isopropanol and dibutyl-para-cresol.

The addition of vinyl bromide to butadiene lowered the molecular weight of the polybutadiene prepared in its presence, as shown by data for DSV's, and number average and weight average molecular weights in Table III. Other unsaturated halocarbons, including beta-bromostyrene, vinylidene chloride, 2-chloropropene and 2-chloro-2-butene were not effective.

TABLE III

| Example | Additive, in Bd | ppm | Polymer wt, g | DSV dl/g | Mol Wt × 10$^{-3}$ Mn | Mw |
|---|---|---|---|---|---|---|
| 17 | Control | 0 | 9.51 | 7.5 | 482 | 1194 |
| 18 | Vinyl Br | 1,000 | 8.43 | 6.5 | 208 | 1070 |
| 19 | Vinyl Br | 2,500 | 7.43 | 6.8 | 270 | 1075 |
| 20 | Vinyl Br | 5,000 | 6.90 | 6.0 | 314 | 1057 |
| 21 | Vinyl Br | 10,000 | 6.55 | 5.8 | 232 | 1008 |
| 22 | Vinyl Br | 25,000 | 8.60 | 4.9 | 180 | 903 |
| 23 | Beta-Br Styrene | 2,500 | 8.75 | 7.6 | ND | ND |
| 24 | Vinylidene Cl | 2,500 | 9.39 | 7.6 | ND | ND |
| 25 | 2-Cl—Propene | 2,500 | 8.11 | 7.9 | ND | ND |

TABLE III-continued

| Example | Additive, ppm in Bd | | Polymer wt, g | DSV dl/g | Mol Wt × 10⁻³ | |
|---|---|---|---|---|---|---|
| | | | | | Mn | Mw |
| 26 | 2-Cl—Butene | 2,500 | 9.24 | 7.2 | ND | ND |

ND = Not Determined
Beta-Br Styrene = Beta-Bromostyrene
Vinylidene Cl = Vinylidene chloride
Vinyl Br = Vinyl bromide
2-Cl—Propene = 2-Chloropropene
2-Cl—Butene = 2-Chlorobutene Examples 27–31

Neat butadiene was polymerized in the presence of vinyl bromine, and in quantities large enough that Mooney viscosities could be determined on the resulting polybutadienes. Approximately 100g of rubber grade butadiene were charged to each of a series of dry, nitrogen-flushed, tared, 950 ml glass bottles, to which a magnetic stirring bar had been added, and which then were sealed with perforated metal crown caps and a rubber liner. Incremental amounts of vinyl bromide were injected by syringe into the butadiene.

The catalyst components were charged by the "in situ" method by injecting (1) 1.75 ml of a 1.2 molar solution of diisobutylaluminum hydride in hexane, (2) 1.0 ml of 0.10 molar neodymium neodecanoate in hexane and (3) 0.4 ml of 0.25 molar ethylaluminum dichloride in hexane into the butadiene in each bottle while the contents were agitated by the magnetic stirring bars. The bottles were then placed in hot (48° C.) water in polyethylene containers on magnetic stirrers for one hour. The stirring bars stopped rotating after about 13 to 23 minutes due to the formation of almost solid polymer. The bottles and contents were very hot, although the water jacket temperature did not reflect this, and actually had cooled to about 44° C. after one hour. The polymerizations in Example Nos. 27–30 were terminated after one hour, and Example No. 31 after 1.75 hour, by injecting 24 mls of a hexane solution containing 1.2 g each of 2,4,6-tris-(dimethylaminomethyl)-phenol and dibutyl-para-cresol into each of the polymers.

The sharply lower molecular weights for the polymers prepared in the presence of vinyl bromide are shown by the data in Table IV.

TABLE IV

| Example | Charge, g | | Polymer wt, g | DSV, dl/g | Mooney Visc | Mol Wt × 10⁻³ | |
|---|---|---|---|---|---|---|---|
| | Bd | Vinyl Br | | | | Mn | Mw |
| 27 | 99.6 | 0 | 80.7 | 4.9 | 56 | 87 | 635 |
| 28 | 100 | 0.55 | 83.4 | 2.7 | 37 | 56 | 438 |
| 29 | 99.6 | 1.0 | 80.5 | 2.8 | 33 | 59 | 410 |
| 30 | 100 | 2.15 | 84.5 | 2.5 | 31.5 | 72 | 432 |
| 31 | 100 | 5.5 | 70.5 | 2.6 | 30 | 65 | 397 |

The microstructures of Polymer Nos. 27 and 31 as determined by infrared spectroscopic analyses were 98% cis-1,4-PBd, 1% trans-1,4- and 1% 1,2-PBD, and 97% cis-1,4-PBd, 1% trans-1,4- and less than 1% 1,2-PBd, respectively. This indicates that the vinyl bromide has no significant effect upon the microstructure.

EXAMPLES 32–33

Neat butadiene was polymerized in somewhat larger quantities by charging approximately 900 grams of dry, liquid butadiene into a 2.5 liter horizontal, cylindrical steel reactor. This reactor was a laboratory kneading reactor which was sealed with a flanged plate through the center of which a high torque drive mechanism was attached to the agitator shaft. A glass plate or sight glass covered the end of the cylinder. There was an electric heating jacket around the reactor cylinder which permitted warming the monomer to 50° C. prior to initiating the neat polymerization reaction.

A cylindrical tube containing a cooling coil was mounted vertically on top of the reactor cylinder. Butadiene and other monomers or desired hydrocarbons were added to the reactor by "bombing" them through a line entering the bottom of this column and into the top of the reactor. Catalyst subsequently was charged through this same line. Coolant was toluene which was chilled in a dry ice-acetone bath and then circulated through the cooling coil. Monomers and other hydrocarbon vapors were condensed and flowed back into the reactor from the cooling column. The reactor pressure (and simultaneously, the reactor temperature) was controlled at 70 psig plus or minus 2 psig and the temperature at 50° C. plus or minus 2° C. by manually adjusting the pumping rate of the coolant.

A second line also entered near the bottom of the condensing (reflux) column and into the top of the reactor. Polymer stabilizers (stopping agent and antioxidant) were bombed into the reactor through this line when it was desired to terminate the polymerization.

Agitation was provided by radial disk shaped elements, which were attached to the rotating horizontal shaft, and which were equipped with mixing and kneading bars. Two rows of two stationary counter-paddles were attached to the inside wall of the cylinder in the areas not wiped by the mixing and kneading bars. The counter-paddles were set so as to scrape and clean the agitator shaft and its disk shaped elements. The interaction of the rotating disks and mixing bars with the counter-paddles provided the good kneading and mixing of the viscous polymer and catalyst, and later of the polymer with the polymer stabilizers, and at the same time provided self-cleaning of the metal surfaces. A preformed catalyst was charged to the reactor to initiate polymerization. The preformed catalyst was prepared in a dry 118 ml glass bottle containing a magnetic stirring bar by charging (1) 1.0 ml of a 2.45 molar solution of butadiene in hexane, (2) 23.4 ml of a 1.2 molar solution of diisobutylaluminum hydride in hexane, and with mixing and moderate cooling, (3) 4.3 ml of 0.66 molar neodymium octoate in hexane and (4) 11.2 ml of 0.25 molar ethylaluminum dichloride solution in hexane. Then 39 ml of the freshly preformed catalyst was withdrawn into a syringe, and was charged into a small, dry, nitrogen flushed steel bomb. The preformed catalyst solution then was charged into the cylindrical reactor under nitrogen pressure. Polymerization was permitted to continue until only a single (solid) phase was visible through the glass plate. The polymerization was terminated by forcing about 5 ml of isopropanol plus a solution containing 7 ml of tris-(dimethylaminomethyl)-phenol plus 6.75 grams of dibutyl-para-cresol dissolved in 200 ml of liquid butadiene into the reactor under nitrogen pressure.

After the stabilization solution had mixed with the polymer for about 10 minutes, the pressure on the reactor was gradually released permitting the non-polymerized hydrocarbons to evaporate. The recovered polymer was dried further at 28 inches of vacuum and about 50° C. for at least 15 hours. The polymer yield obtained in Example No. 32—a control experiment—was 732 g, or 81.5 percent conversion.

Example No. 33 was conducted in a very similar manner except that after charging the butadiene to the reactor, 19 grams of vinyl chloride was forced with nitrogen pressure into the reactor before the contents were warmed to 50° C. and prior to adding the catalyst. A comparison of the results presented in Table V demonstrate the effect of vinyl chloride to lower the polymer molecular weight. An infrared analysis of the polymer prepared in Example 33 showed that its microstructure was 98% cis-1,4-PBd, 1% trans-1,4-PBd and less than 1% 1,2-PBd. Thus the vinyl chloride had no effect upon the microstructure of the polymer.

TABLE V

| Example | Charge, g Bd | Charge, g Vinyl Cl | Pzn Time Min | Polymer Yield, g | Mooney Visc | DSV, Dl/g | Mol wt × $10^{-3}$ Mn | Mol wt × $10^{-3}$ Mw |
|---|---|---|---|---|---|---|---|---|
| 32 | 899 | 0 | 16.5 | 732 | 107 | 3.3 | 181 | 562 |
| 33 | 897 | 19 | 13.0 | 666 | 57 | 2.8 | 130 | 443 |

Examples 34–41

A premix solution containing about 133 grams of isoprene per liter of solution in hexane was prepared, passed down a silica gel column, and sparged with nitrogen. Aliquots of 100 ml of this solution were dispensed into a series of eight narrow-mouthed 118 ounce bottles.

A preformed catalyst was prepared in the same manner and proportions of catalyst components as described in Example Nos. 32 and 33.

TABLE VI

| Example | Halide added, ppm to isoprene | Yield wt % | DSV, dl/g |
|---|---|---|---|
| 34 | none (control) | 36 | 5.35 |
| 35 | 2,500 V$^a$ Cl | 35 | 5.2 |
| 36 | 5,000 V Cl | 36 | 5.1 |
| 37 | 10,000 V Cl | 36 | 4.8 |
| 38 | 2,500 V Br | 36 | 5.6 |
| 39 | 5,000 V Br | 30 | 4.7 |
| 40 | 10,000 V Br | 27 | 4.5 |
| 41 | 10,000 Benzyl Cl | 36 | not analyzed |

$^a$V = vinyl

The amounts of organic halides listed in the second column of Table VI were injected as solutions in hexane, as described in Example Nos. 10–16, into the bottles of isoprene in hexane premix. The 0.58 ml of the preformed catalyst was injected. This amount was equivalent to a catalyst charge of Bd/DIBA-H/NdOct-/EADC =2/2.5/0.25/0.25 millimole per 100 grams of isoprene. The bottles were recapped and placed in a polymerization bath controlled at 50° C. where the contents were tumbled end-over-end. As the polymerizations progressed, viscous cements formed in all bottles except for the instance where benzyl chloride had been added. In this case, the polyisoprene was insoluble in hexane and small solid particles of it tumbled in semi-suspension. The polymerizations were terminated after four hours (16 hours in Example No. 41) by adding 0.06 g of 2,4,6-tris-(dimethylaminomethyl)phenol and 0.12 g of dibutyl-para-cresol in hexane solution.

The data in the last column in Table VI illustrate that the presence of either vinyl chloride or vinyl bromide during polymerization lowers the molecular weights (DSV) of the resulting polyisoprenes. The vinyl halides had no effect upon the polymer microstructure. However, the benzyl chloride apparently resulted in numerous radicals which caused cyclization of the polyisoprene.

While certain representative embodiments and details have been shown for the purpose of illustrating the present invention, it will be apparent to those skilled in this art that various changes and modifications can be made therein without departing from the scope of the invention.

What is claimed is:

1. A process which comprises polymerizing at least one conjugated diolefin monomer in the presence of (a) a catalyst system which is comprised of (1) an organoaluminum compound, (2) an organometallic compound which contains a metal from Group III-B of the Periodic System and (3) at least one compound which contains at least one labile halide ion; and (b) from 0.05 phm to 10 phm of a vinyl halide.

2. In a process for polymerizing conjugated diolefin monomers into polymers which utilizes a catalyst system which is comprised of (1) an organoaluminum compound, (2) an organometallic compound which contains a metal from Group III-B of the Periodic System, and (3) at least one compound which contains at least one labile halide ion; the improvement which comprises controlling the molecular weight of the polymer being produced by conducting the polymerization in the presence of from 0.05 phm to 10 phm of a vinyl halide.

3. A process as specified in claim 1 wherein said vinyl halide is selected from the group consisting of vinyl bromide, vinyl chloride, and vinyl iodide.

4. A process as specified in claim 3 wherein said organoaluminum compound corresponds to the formula AlR$_1$R$_2$R$_3$ wherein R$_1$ is selected from a group consisting of alkyl, cycloalkyl, alkoxy, aryl, alkaryl and arylalkyl radicals and hydrogen; R$_2$ is selected from the group consisting of alkyl, cycloalkyl, aryl, alkaryl and arylalkyl radicals and hydrogen and R$_3$ is selected from the group consisting of alkyl, cycloalkyl, aryl, alkaryl and arylalkyl radicals; wherein said organometallic compound corresponds to the formula ML$_3$, wherein M is a metal from Group III-B of the Periodic System and wherein L is an organic acid ligand selected from the group consisting of hydrocarbyl monocarboxylic acids and hydrocarbyl dicarboxylic acids; and wherein said compound which contains at least one labile halide ion is selected from the group consisting of alkyl halides, aryl halides, alkaryl halides, arylalkyl halides, and cycloalkyl metal halides wherein the metal is selected from Groups II-A, III-A, and IV-A of the Periodic System.

5. A process as specified in claim 4 wherein the mole ratio of the organoaluminum compound to the Group III-B metal ranges from about 4/1 to about 200/1.

6. A process as specified in claim 5 wherein the organoaluminum compound is selected from the group consisting of trialkylaluminum compounds and dialkylaluminum hydride compounds.

7. A process as specified in claim 6 wherein said Group III-B metal is a lanthanide.

8. A process as specified in claim 7 wherein said conjugated diolefin monomer is selected from the group consisting of 1,3-butadiene, isoprene, 2-ethyl-1,3-butadiene, 1,3-pentadiene, 2-methyl-1,3-pentadiene, 4-butyl-1,3-pentadiene, 2,3-dimethyl-1,3-pentadiene, 1,3-hexadiene, 1,3-octadiene, 1-phenyl-1,3-butadiene, 2,3-dibutyl-1,3-pentadiene and 2-ethyl-1,3-pentadiene.

9. A process as specified in claim 2 wherein said conjugated diolefin monomer is selected from the group consisting of 1,3-butadiene, isoprene, and 1,3-pentadiene.

10. A process as specified in claim 9 wherein said vinyl halide is selected from the group consisting of vinyl bromide, vinyl chloride, and vinyl iodide.

11. A process as specified in claim 10 wherein from 0.1 phm to 2.5 phm of said vinyl halide is present.

12. A process as specified in claim 11 wherein said vinyl halide is selected from the group consisting of vinyl chloride and vinyl bromide.

13. A process as specified in claim 10 wherein said vinyl halide is vinyl chloride.

14. A process as specified in claim 8 wherein said lanthanide is selected from the group consisting of neodymium, praseodymium, cerium, and gadolinium.

15. A process as specified in claim 14 wherein the ratio of labile halide ions to lanthanide metal atoms ranges from 0.5/1 to 3.5/1.

16. A process as specified in claim 15 wherein the mole ratio of the organoaluminum compound to the Group III-B metal ranges from about 10/1 to about 50/1.

17. A process as specified in claim 3 wherein the polymerization is carried out utilizing a bulk polymerization procedure.

18. A process as specified in claim 3 wherin the polymerization is carried out utilizing a solution polymerization procedure.

19. A process as specified in claim 16 wherein said catalyst system is a preformed catalyst system which was prepared in the presence of a 1,3-diolefin.

20. A process as specified in claim 16 wherein the polymerization is carried out at a temperature within the range of about 10° C. to about 90° C.

21. A process as specified in claim 20 wherein aid conjugated diolefin monomer is 1,3-butadiene.

22. A process as specified in claim 20 wherein said conjugated diolefin monomer is isoprene.

23. A process as specified in claim 3 wherein said conjugated diolefin monomer is 1,3-butadiene.

24. A proces which comprises homopolymerizing 1,3-butadiene into polybutadiene in the presence of (a) a catalyst system which is comprised of (1) an organoaluminum compound, (2) an organometallic compound which contains a metal from Group III-B of the Periodic System and (3) at least one compound which contains at least one labile halide ion; and (b) a vinyl halide; wherein said process is carried out at a temperature with the range of −60° C. to 150°C.

25. A process as specified in claim 24 wherein from 0.05 phm to 10 phm of said vinyl halide is present; wherein said vinyl halide is selected from: the group consisting of vinyl bromide, vinyl chloride, and vinyl iodide; wherein the Group III-B metal is a lanthanide; and wherein the polybutadiene produced has a microstructure which contains more than 95 percent 1,4-configuration.

26. A process as specified in claim 25 wherein said labile halide ions are selected from the group consisting of inorganic halide acids and organometallic halides; wherein said lanthanide is selected from the group consisting of cerium, praseodymium, neodymium, and gadolinium; wherein the organoaluminum compound is selected from the group consisting of trailkylaluminums and alkylaluminum hydrides; wherein the molar ratio of the organoaluminum compound to the Group III-B metal ranges from about 4/1 to about 200/1; wherein the molar ratio of 1,3-butadiene to the Group III-B metal ranges from 0.2/1 to 3000/1; and wherein said vinyl halide is selected from the group consisting of vinyl chloride and vinyl bromide.

27. A process as specified in claim 25 wherein said organoaluminum compound is selected from the group consisting of diethylaluminum hydride, di-n-propylaluminum hydride, di-n-butylaluminum hydride, diisobutylaluminum hydride, diphenylaluminum hydride, di-p-tolylaluminum hydride, dibenzylaluminum hydride, phenylethylaluminum hydride, phenyl-n-propylaluminum hydride, p-tolyethylalumin hydride, p-tolyl-n-propylaluminum hydride, p-tolylisopropylaluminum hydride, benzylethylaluminum hydride, benzyl-n-propylaluminum hydride, benzylisopropylaluminum hydride, ethylaluminum dihydride, butylaluminum dihydride, isobutylaluminum dihydride, octylaluminum dihydride, amylaluminum dihydride, trimethylaluminum, triethylaluminum, tri-n-propylaluminum, triisopropylaluminum, tri-n-propylaluminum, triisopropylaluminum, tri-n-butylaluminum, triisobutylaluminum, tripentylaluminum, trihexylaluminum, trioctylaluminum, triphenylaluminum, tri-p-tolyaluminum, tribenzylaluminum, ethyldiphenylaluminum, ethyl-di-p-tolylaluminum, ethyldibenzylaluminum, diethylphenylaluminum, diethyl-p-tolylaluminum, and diethylbenzylaluminum; wherein said labile halide ions are selected from the group consisting of hydrogen bromide, hydrogen chloride, hydrogen iodide, ethylmagnesium bromide, butylmagnesium bromide, phenlmagnesium bromide, methylmagnesium chloride, butylmagnesium chloride, ethylmagnesium iodide, phenylmagnesium iodide, diethylaluminum bromide, diiosbutylaluminum bromide, methylaluminum sesquibromide, diethylaluminum chloride, ethylaluminum dichloride, ethylaluminum sesquichloride, diisobutylaluminum chloride, isobutylaluminum dichloride, dihexylaluminum chloride, cyclohexylaluminum dichloride, phenylaluminum dichloride, didodecyaluminum chloride, diethylaluminum fluoride, dibutylaluminum fluoride, diethylaluminum iodide, dibutylaluminum iodide, phenylalulminum diiodide, trimethyltin bromide, triethyltin chloride, dibutyltin dichloride, butyltin trichloride, diphenyltin dichloride, and tributyltin iodide; wherein the lanthanide is neodymium; wherein the molar ratio of the organoaluminum compound to the Group III-B metal ranges from about 8/1 to about 100/1; wherein the molar ratio of 1,3-butadiene to neodymium ranges from about 5/1 to about 500/1; wherein said process is carried out at a temperature within the range of about 10° C. to about 90° C.; wherein from: 0.1 phm to 2.5 phm of. said vinyl halide is present; and wherein said vinyl halide is selected from the group consisting of vinyl chloride and vinyl bromide.

28. A process as specified in claim 27 wherein said homopolymerization is carried out utilizing a bulk polymerization procedure wherein the reaction medium contains less than 4% by weight solvents for the polybutadiene being synthesized, based upon the total weight of the reaction medium.

29. A process as specified in claim 28 wherein said organometallic compound is selected from the group consisting of neodymium octoate, neodymium neodecanoate, and neodynium 2-ethyl hexanoate.

30. A process as specified in claim 29 wherein said labile halide ion is ethylaluminum dichloride and wherein said organoaluminum compound is selected from the group consisting of triisobutylaluminum and diisobutylaluminum hydride.

31. A process as specified in claim 16 wherein said lanthanide is neodymium.

* * * * *

UNITED STATES PATENT AND TRADEMARK OFFICE
CERTIFICATE OF CORRECTION

PATENT NO. : 4,663,405

DATED : May 5, 1987

INVENTOR(S) : Throckmorton

It is certified that error appears in the above-identified patent and that said Letters Patent is hereby corrected as shown below:

In Col. 13, line 29, kindly delete the word "ounce" and substitute therefore the term --ml--.

In Col. 15, line 39, please delete the term "aid" and substitute therefore the term --said--.

In Col. 15, line 45, please delete the term "proces" and substitute therefore the term --process--.

In Col. 16, line 52, after the term "100/1;" add the language --wherein said catalyst system is a preformed catalyst system;--.

In Col. 16, line 53, before the word "ranges" please add the language --in said preformed catalyst system--.

Signed and Sealed this

Twenty-ninth Day of December, 1987

Attest:

DONALD J. QUIGG

Attesting Officer

Commissioner of Patents and Trademarks